S. THOMAS.
Gudgeons or Bearings for Ore-Washers.

No. 142,530.  Patented September 2, 1873.

Witnesses.
Edwin Mickley
F. C. Eckensberger

Inventor.
Samuel Thomas

UNITED STATES PATENT OFFICE.

SAMUEL THOMAS, OF CATASAUQUA, ASSIGNOR TO JAMES W. MICKLEY, OF HOKENDAUQUA, PENNSYLVANIA.

IMPROVEMENT IN GUDGEONS OR BEARINGS FOR ORE-WASHERS.

Specification forming part of Letters Patent No. 142,530, dated September 2, 1873; application filed July 31, 1873.

*To all whom it may concern:*

Be it known that I, SAMUEL THOMAS, of Catasauqua, Lehigh county, in the State of Pennsylvania, have invented certain new and useful Improvements in the Gudgeons or Bearings for the Wooden Shafts of Ore-Washers; and do hereby declare the following to be a full and clear description of the same, reference being had to the accompanying drawing, in which—

Figure 1:
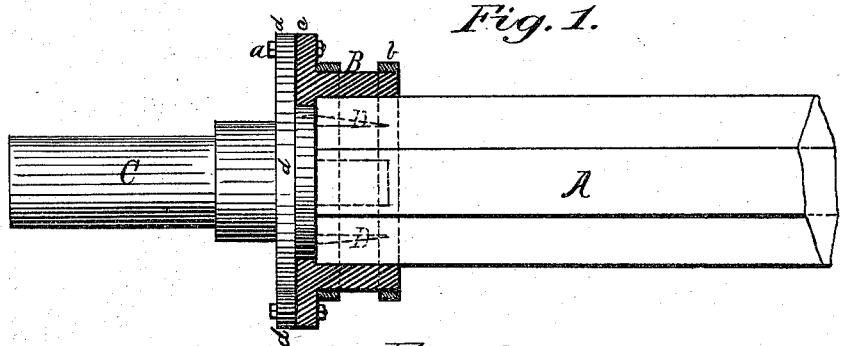
Figure 2:
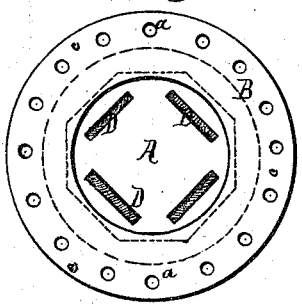

Figure 1 is a side view, partly in section, of a wooden shaft having my improvement attached; and Fig. 2 is an end view of the same with the bearing or journal portion detached.

My improvements are designed more particularly for use in ore-washers where revolving wooden shafts are used having iron gudgeons placed at the ends of such shafts, but my invention is applicable to all cases where metal bearings are attached to wooden shafts; and consists principally in making the gudgeon of two parts separable from each other, one of which forms a cap or band, and is permanently fastened or secured to the wooden shaft and the other part consisting of the journal or bearing.

The value of this invention in its application to ore-washers will be more readily understood by reference to the ore-washer described in my Letters Patent dated September 30, 1856, to which the present improvements are more particularly adapted. In this class of ore-washers the shaft is of wood, having radial arms attached along its surface, and the gudgeons which are made in one piece are placed in position by letting their projecting wings or arms into clefts, mortised into the end of the wooden shaft, and permanently thereto by wedging and shrinking on iron hoops. As there is very great strain upon these gudgeons, owing to the length of the shafts and the heavy work they perform in stirring up the ores, the gudgeons or bearings often break and have to be replaced with entirely new ones, which occasions great delay and heavy expense, and frequently so mutilates the end of the shaft as to destroy its usefulness.

In order to obviate these difficulties I provide the end of the wooden shaft with an iron band or cap, which is permanently attached to the shaft, and provided with a flange, to which I attach the journal by means of a carrier-flange and screw-bolts.

In the drawings, A represents the octagonal shaft of an ore-washer, and B a metal band or cap made of the proper size and shape to fit the end of the shaft A and provided with a projection or flange, c. C is the journal or gudgeon, which has a carrier-flange, d, at its base of the same size as the flange on the band B, and both these flanges are provided with corresponding holes through which the screw-bolts a a pass and fasten the journal to the band. The band or cap B has a concentric circular opening, into which a corresponding projection on the journal carrier-flange enters, thus quickly securing the central position of the journal in the shaft. The band B may be strengthened by shrinking on wrought-iron hoops b b, and before the journal C is placed in position the wedges D D are driven into the end of the shaft.

It will be perceived from the foregoing description that by making the band or cap and journal in separate pieces, as herein described, the journal or bearing C may be easily detached from the shaft when it breaks, and replaced by a new one without disturbing the cap or band B or in any manner mutilating the end of the shaft, whereas, by the usual manner of fastening the ordinary wing-gudgeon to the end of the shaft the bands and the wings become worthless when the bearing is broken, and have to be entirely removed, thereby mutilating and greatly injuring the shaft, as well as involving delay and expense, all of which is avoided by my improvement.

Having described my invention and its construction and mode of operation, what I claim as new, and desire to secure by Letters Patent, is—

The journal or bearing C and cap or band B, in combination with the shaft A, substantially as shown and described.

SAMUEL THOMAS.

Witnesses:
J. HOMER HILDRETH,
A. B. MALCOMSON, Jr.